May 23, 1967

J. F. CODY ETAL 3,320,731

AIR SUPPORTED MOWING MACHINE

Filed March 11, 1964

INVENTOR.
JOHN F. CODY
GEORGE W SITES
BY
Newton, Hopkins & Jones
ATTORNEYS

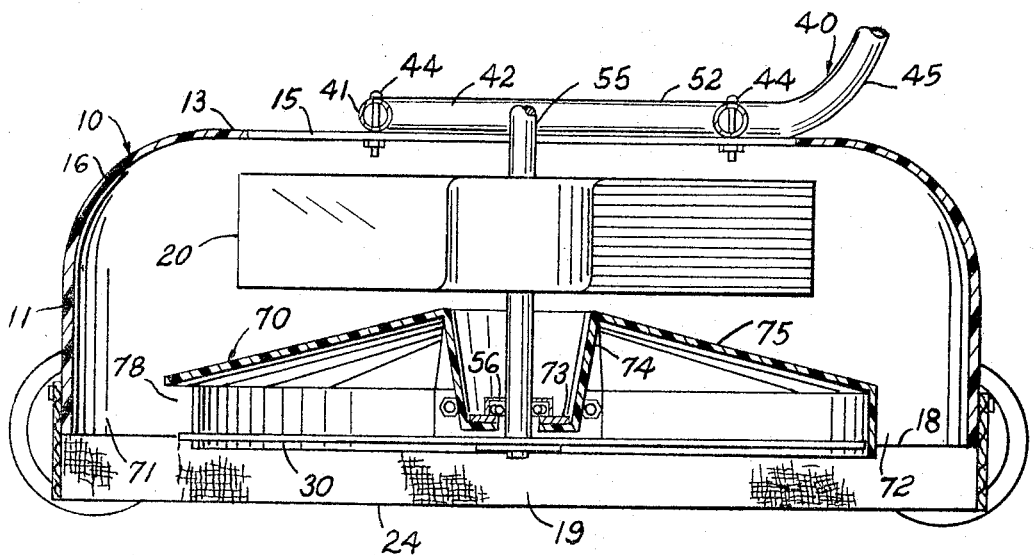

May 23, 1967  J. F. CODY ET AL  3,320,731
AIR SUPPORTED MOWING MACHINE

Filed March 11, 1964 3 Sheets-Sheet 3

INVENTOR.
JOHN F. CODY
GEORGE W. SITES
BY Newton, Hopkins & Jones
ATTORNEYS

_United States Patent Office_ 3,320,731
Patented May 23, 1967

3,320,731
AIR SUPPORTED MOWING MACHINE
John F. Cody and George W. Sites, Quincy, Fla., assignors, by direct and mesne assignments, of nine-twentieths to Walter S. McNeilly and one-twentieth to Gerald D. Bryant, both of Tallahassee, Fla.
Filed Mar. 11, 1964, Ser. No. 351,055
9 Claims. (Cl. 56—25.4)

This invention relates to an air supported mowing machine and is more particularly concerned with a rotary mower which is supported at a proper distance above the ground by a cushion of air.

This application is an improvement over the invention of our copending application Ser. No. 236,108 filed Nov. 7, 1962, for "Mowing Machine."

In the past, power lawn mowers of the type having rotary blades have been widely accepted and used. Such prior art mowers have been supported on wheels which define the position of the blade above the ground. A change in height of a blade on a lawn mower has usually involved the raising or lowering of the wheels which support the housing of the mower or raising or lowering the blade itself. This is time consuming.

Either the power lawn mower described above is manually pushed across the surface of the lawn or it is power driven. A power driven lawn mower usually has a drive connected between the engine which drives the blade and one or a plurality of the wheels, there being provided a clutch mechanism between the engine and the wheel or wheels by which the wheel or wheels may be engaged and disengaged.

The power driven lawn mowers, while cutting the grass satisfactorily, are not too successful in their self propelled operation. For example, if the power wheel or wheels do not engage the ground firmly, the lawn mower will not be propelled thereover. Thus, on irregular ground, the mower must be manually pushed, periodically. Likewise, when the mower is cutting fresh grass, the severed grass tends to stick to the mower wheels to decrease the traction of the wheels.

The conventional power driven mower also has the disadvantage of the wheels digging into the ground when wet, soft or freshly cultivated ground is encountered, thereby leaving long unsightly furrows which become essentially permanent when the ground becomes firm.

Usually, on the conventional lawn mower, wheels are mounted so that the mower may be propelled along a longitudinal path but cannot be readily turned without first lifting the front wheels. When sharp turns are made, the wheels tend to dig into the ground and thereby leave scars in the lawn.

Efforts have been made to eliminate the wheels from the lawn mower by substituting therefor skids on the housing or on the rotating blade. Lawn mowers having these skids have not been well accepted since such skids tend to pack down the grass.

The prior art rotary lawn mowers also have the disadvantage of windrowing the discharged severed ends of the grass, thereby giving a streaked appearance to the mowed lawn.

While vehicles such as automobiles have, in the past, been supported on cushions of air, it would normally be expected that, if such support were applied to lawn mowers, the blast of air downwardly would flatten the grass and thereby prevent the lawn mower from functioning properly.

In our above identified copending application, we have disclosed broadly a mowing machine which is supported by a cushion of air, the air being drawn into the housing of the mowing machine and discharged downwardly for supporting the weight of the machine. By tilting the machine of our copending application, in one direction or the other, it is caused to spill air in one direction or the other, thereby propelling the machine in the direction in which it is tilted.

Briefly, the present invention which overcomes the disadvantages described above includes a housing defining a hollow, oval shaped, open ended tubular member within which, on a common shaft, are a lawn mower blade and an impeller or propeller blade, the propeller blade being above the mower blade. The common shaft is driven by a gasoline engine mounted above the hollow portion of the housing so as to be in the path of travel of the air drawn into the housing by the propeller. Interposed between the two blades is a hood shaped downwardly opening, baffle which surrounds the lower blade and carries a bearing for the shaft. The sides of the hood shaped baffle are secured to the inner sides of the housing while the front and rear portions of the baffle are spaced inwardly from the housing to provide front and rear passageways for the air which is directed downwardly by the propeller blade, the air creating the cushion of air which supports the mowing machine in operation. Within the baffle and communicating with one of the passageways is a port which permits the discharge of the cut grass into the air stream. A sleeve or skirt of relatively impervious flexible material adjustably surrounds the lower end of the housing to define the mean heights above the ground that the blade is suspended, while the height may be further regulated to a certain extent through the control of the speed of the engine.

A handle connected to the housing permits the housing to be tilted in one direction or the other so as to cause the spilling of air to a greater extent in one direction. This spilling of air imparts movement to the housing in the direction of tilt.

Accordingly, it is an object of the present invention to provide a mowing machine which is supported on a cushion of air and has no elements which continuously engage the ground during its cutting operation.

Another object of the present invention is to provide a mowing machine which may be propelled over the ground in any selected direction, the direction of travel and the rate of travel being controlled by the operator through tilting of the mowing machine.

Another object of the present invention is to provide a mowing machine which is inexpensive to manufacture, durable in structure and efficient in operation.

Another object of the present invention is to provide a mowing machine which has few moving parts to get out of adjustment and is well suited to the demands of economical mass production.

Another object of the present invention is to provide a mowing machine in which the height of the cutting blade above the surface to be mowed may be readily and easily varied.

Another object of the present invention is to provide a mowing machine which is lightweight and rugged in construction and has provided a long, trouble free, useful life.

Another object of the present invention is to provide a mowing machine which will ride smoothly over the vegetation to be mowed, regardless of minor variations in the contour of ground thereunder, to provide a smooth uniform height cutting operation.

Another object of the present invention is to provide a mowing machine which will create essentially no windrowing effect when the cut grass is discharged from the machine.

Another object of the present invention is to provide a mowing machine which is supported by a cushion of air and yet is capable of being urged along inclines and over rough terrain.

Another object of the present invention is to provide a mowing machine which may be self-propelled by the discharge of air from the bottom of the machine, the machine being tilted in the direction in which it is to travel.

Another object of the present invention is to provide a mowing machine which affords protection to a person operating the machine so that the person will not readily be engaged by the blade of the mowing machine.

Other and further objects, features and advantages will become apparent from the following description when taken in conjunction with the accompanying drawing wherein like characters of reference designate corresponding parts throughout the several views, and wherein:

FIG. 3 is a vertical sectional view taken substantially along line 3—3 in FIG. 2.

FIG. 4 is a vertical sectional view taken substantially along line 4—4 in FIG. 2.

Figure 1:
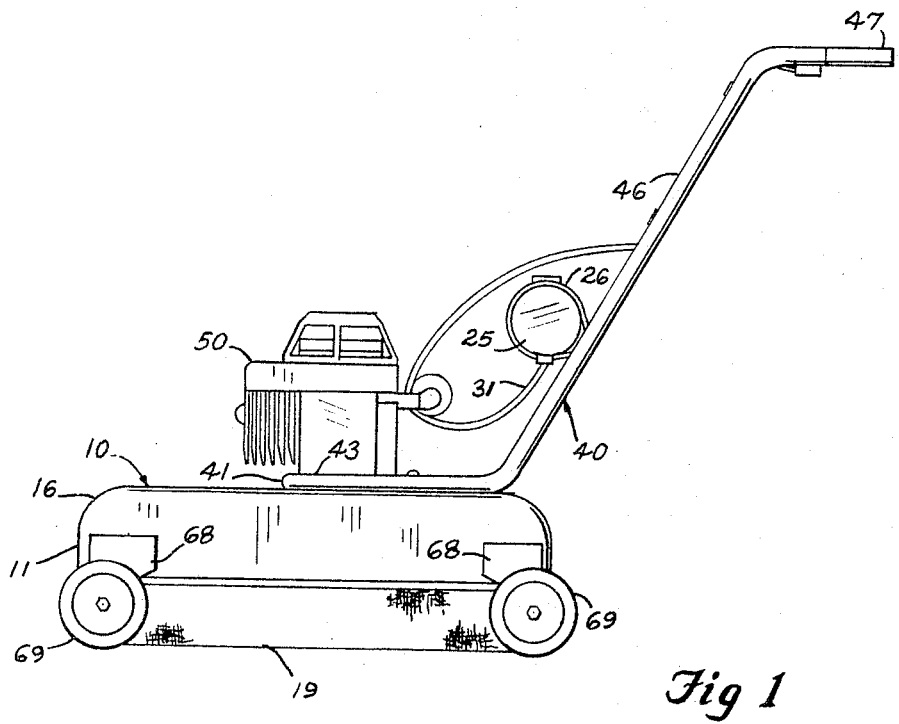
FIG. 1 is a side elevational view of a mowing machine constructed in accordance with the present invention.

Referring now in detail to the embodiment chosen for the purpose of illustrating the present invention, it being understood that in its broader aspects the present invention is not limited to the exact details herein depicted, numeral 10 denotes generally the housing of the rotary mower or mowing machine within which is the impeller or propeller blade 20 and the mowing or cutting blade 30. A handle assembly 40 connected to the housing 10 permits control of the mowing machine by the operator, while a gasoline engine 50 is the prime mover which rotates the blade 30 and the propeller blade 20 simultaneously.

In more detail, the housing 10 is preferably formed from fibre glass reinforced polyester; however, it will readily be understood that metal, for example aluminum, steel, or magnesium alloy may be substituted therefor and that other plastics and reinforced plastics are suitable for materials of construction for the housing. The housing 10 is a hollow tubular member open at both its top and bottom to provide for the ingress and egress of air. Housing 10 includes an annular oval shaped housing body 11 which is longer than it is wide, the housing body 11 defining a chamber open at its bottom. Projecting inwardly from the inwardly rounded, upper edge portion 16 of housing body 11 is a flat web or top 13 provided with a large central circular top opening 15 for the ingress of air into housing 10. The bottom edge 18 of housing body 11 terminates in a transverse plane parallel to top 13.

Surrounding the edge 18 is an annular skirt 19 retained in place overlapping a portion of the outside surface of body 11 by bolts 21.

It will be understood that, while the skirt 19 is preferably formed from a woven polyethylene, such as is commonly used as tape for lawn furniture, other materials which are flexible and tough and are impervious to air to the extent sufficient to create back pressure for lifting the lawn mower are suitable. Such materials do not necessarily have to confine a major portion of the air, if the circulation of air is sufficient to straighten out the skirt and permit a spillage of air below the bottom edge 24 of the skirt 19.

While the flexible skirt 19 materially improves the performance of the lawn mower, the lawn mower is nevertheless operative without the skirt 19 and it will be understood that even a metal skirt 19 could be used; however, such a metal skirt is not recommended for best results.

Mounted on the top 13 is the base of the handle assembly 40. The base of handle assembly 40 is a U-shaped member formed from tubular metal, such as aluminum, and including a cross bar 41 at the forward end of the handle assembly and a pair of arms 42 and 43 projecting rearwardly from the ends of cross bar 41, the arms 42 and 43 extending respectively parallel to each other on opposite sides of opening 15. The cross bar 41 and arms 42 and 43 are so dimensioned that the cross bar 41 extends across the oval opening 15 forwardly of the vertical center line of the housing 10. Bolts 44 secure the arms 42 and 43 to the upper surface of top 13.

Figure 2:
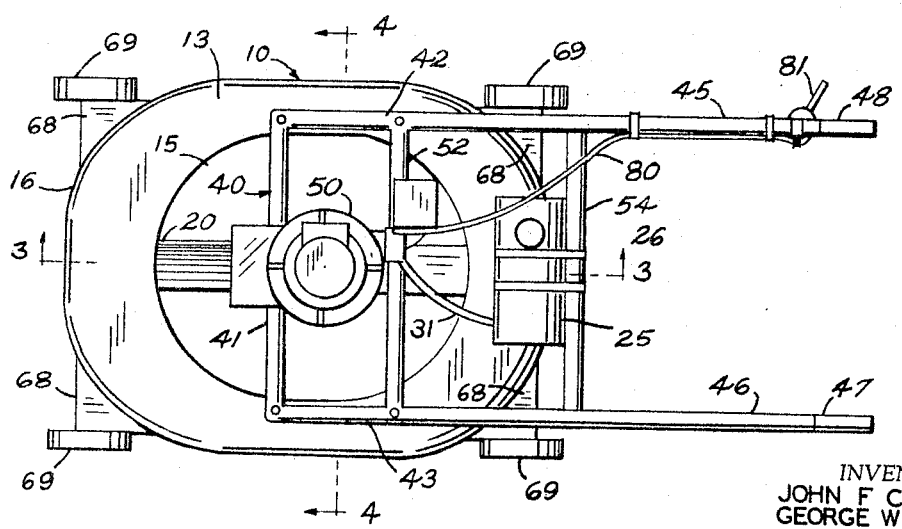
FIG. 2 is a plan view of the mowing machine shown in FIG. 1.
Figure 5:
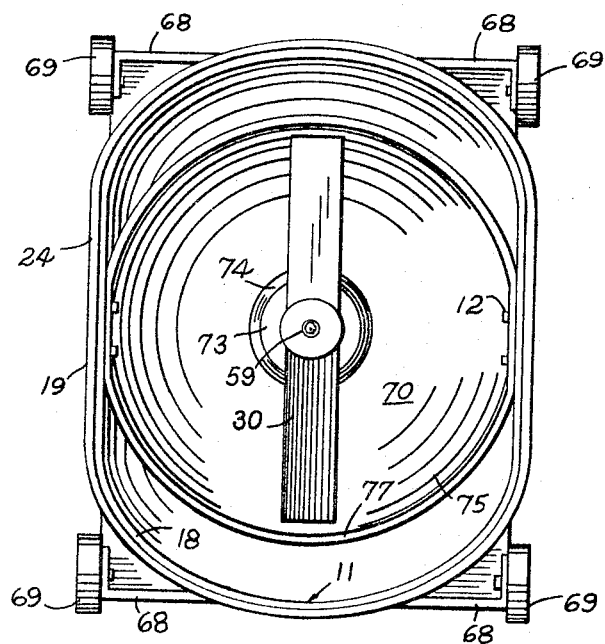
FIG. 5 is a bottom plan view of a portion of the machine shown in FIG. 1.

From the rear ends of arms 42 and 43, the parallel legs 45 and 46 of the handle assembly 40 extend upwardly and rearwardly, as illustrated in FIGS. 1 and 2, the legs 45 and 46 being bent rearwardly to form spaced parallel handles 47 and 48.

Extending between the legs 45 and 46, intermediate the ends of legs 45 and 46, is a cross bar 54, the central portion of which supports by means of straps 26, a gasoline tank 25. A flexible tube 31 connects the gasoline tank 25 to a motor 50.

A mounting bar 53 extends between intermediate portions of arms 42 and 43 so as to pass on the rear side of the vertical center line or vertical axis of housing 10. The motor or engine 50, which in the present embodiment is an internal combustion gasoline engine, is supported by bars 41 and 52. Any other suitable electric motor or other type of prime mover may be employed in place of engine 50, is desired. The engine 50 is provided with a downwardly extending drive shaft 55 which protrudes down through the center of hole or opening 15, along the centerline or vertical axis of housing 10, and through a bearing 56, to terminate therebelow.

For supporting the bearing 56 and for dividing the lower portion of the chamber of housing 11 into forward and rear passageways 71 and 72 is a hood shaped baffle 70. In more detail, the hood shaped baffle is formed preferably of a hard tough molded plastic material and includes cup shaped hub having an annular base 73 and an upwardly diverging frusto-conical wall 74 extending from the edge of base 73. A downwardly diverging, frusto-conical, baffle plate 75 extends from the upper edge of wall 74, to terminate in an annular cylindrical downwardly extending apron or cowling 76, the opposite sides of which are secured by the bolts 21 to the inner sides of body 11.

The lower edge 77 of the cowling 76 terminates generally in the plane of rotation of the blade 30, slightly below the lower edge 18 of the housing body 11 but well above the lower edge 24 of the skirt 19, when the skirt is extended, as illustrated.

In the front portion of the cowling 76 is a downwardly opening port 78, seen in FIG. 3, the port 78 extending vertically, the height of the cowling 76 so that the chamber of the baffle 70 above the blade 30 communicates with the forward passageway 71 whereby any cut grass may be discharged into the stream of air passing through passageway 71.

It will be understood that the bearing 56 is a flange type bearing which is secured by bolts (not shown) to base 73.

The blade 30 is mounted on the end of shaft 55 immediately below bearing 56 and base 73, within the bottom portion of the chamber of baffle 70, by means of a bolt 59 which threadedly protrudes into the end of shaft 55. A friction washer, between the bolt 59 and blade 30, aids bolt 59 in retaining the blade 30 in place. Blade 30 extends diametrically across the chamber of baffle 70 terminating slightly inwardly of the cowling 76 and is essentially a conventional blade for rotary lawn mowers. In the present embodiment, the blade 30 is illustrated as a rectangular member secured by its central portion to shaft 55. It will be observed in FIG. 3 that the blade 30 is disposed in a transverse plane, normal to the axis of shaft 55 and slightly above or inwardly of the plane of the edge 77.

For creating a downward blast of air, i.e., to produce a positive pressure within housing 10, the impeller or propeller blade 20 is mounted on shaft 55 for rotation therewith. The propeller blade 20 is, positioned above baffle 70, below opening 15, and more specifically within the confines of its housing 10 and immediately below the plane of the top 13. The propeller blade 20 and blade 30 are therefore fixed on a common shaft 55 and are simultaneously rotated in the same direction upon rotation of shaft 55 by the motor or engine 50.

Projecting from the corner portions of housing 10 are outwardly protruding brackets 68, each of which is provided with a wheel 69. Thus, there are two front wheels 69 and two back wheels 69 mounted on transverse axes, the lower portions of the wheels 69 engaging the ground below the lower edge 24 of the skirt 19.

The usual Bowden wire 80 connected to a lever 81 on handle 48 controls the speed of engine 50.

OPERATION

From the foregoing description, the operation of the present rotary mower should be apparent. When the rotary mower here disclosed is in its normal position, it rests upon the wheels 69 and the skirt 19 projects downwardly to terminate with its edge 24 slightly above the ground. Hence a substantially closed chamber defined by the surface on which the mower rests and the housing 10, except for the upper opening 15, is provided. When the engine 50 is started, it rotates shaft 55, the propeller blade 20 and mower blade 30 in a counterclockwise direction as viewed in FIG. 2. Air is, therefore, drawn in through opening 15 and directed downwardly by propeller blade 20, thereby creating a pressure in the chamber of the housing body 11. The compressed air thus created is then divided by the baffle 70 and directed, through passageways 71 and 72, downwardly against the ground or other surface on which the mower rests. The air then spills out around the lower edge 24 of skirt 19 in sufficient quantity to lift the whels 69 off the ground. By such an arrangement a cushion of air is created on which the housing 10 rests or rides at a short distance above the ground. The mower is relatively stable at this short distance above the ground since any raising of the housing 10 will increase the annular opening between the ground and the skirt 19, thereby venting any compressed air to the atmosphere and decreasing the pressure within the chamber of housing 10, while any decrease in the annular opening will increase the pressure in the chamber of housing 10.

At the same time, the blade 20 creates downwardly directed streams of air, the mower blade 30, as is customary, creates a vacuum below blade 30 and builds up a pressure in the chamber of baffle 70. This tends to circulate the air, via port 78, again into the passageway 71. The vacuum of the blade 30 tends to lift the grass or vegetation which has been blown flat by the air blast across edge 24. When the grass or vegetation is lifted, it is cut by blade 30 in the usual manner.

To propel the mower in any given direction, the mower is simply tilted in that direction. The tilting is accomplished by manipulation of the handles 47 and 48 which, in effect, serve as a means for regulating the direction of flow of the air. In other words, the tilting of handles 47 and 48 causes more air to be spilled from the portion of the edge 24 of skirt 19 opposite the intended direction of travel. This increased flow causes a reaction because of the pressure differential to propel the mower in the selected direction. Sidewise movement is as easy to attain as forward and rearward movement.

The wheels 69 assure that even if an incline or valley is encountered, the blade 30 will be maintained at a proper height above the ground, in that the wheels will prevent any appreciable drop in the housing 10 if the air cushion is temporarily lost.

When the mowing operation is completed, the engine 50 is shut off and the mower again rests on the wheels 69. It may then be readily transported by wheels 69 in the conventional way.

It will be obvious to those skilled in the art that many variations may be made in the embodiment chosen for the purpose of illustrating the present invention without departing from the scope thereof as defined by the appended claims.

We claim:

1. In a mowing machine of the class wherein a housing carries a prime mover which drives, in a predetermined path of travel, a blade which engages vegetation to be severed from the ground, the combination therewith of means for directing sufficiently strong separate streams of air against the ground on diametrically opposite sides of said housing to raise said housing from the ground.

2. In a mowing machine of the class having a housing, a prime mover mounted on said housing and a cutting blade driven by said prime mover for engaging and cutting vegetation below said housing, the combination wherein said housing is an upright hollow tubular member provided with a pair of separate opposed passageways opening adjacent the ground and an intake opening, and an impeller mounted with said housing and driven by said prime mover for drawing air into said housing through said intake opening and for directing said air downwardly through said passageways for supporting said housing off the ground over which said mowing machine is to be moved.

3. A moving machine comprising a housing body having an upper edge and a bottom edge defining a chamber therebetween, the chamber being provided with a pair of separate opposed passageways opening at their bottom portions, a top across the upper edge of said housing body, said top defining an upper opening for the ingress of air into said chamber, a shaft extending through said upper opening into said chamber, a prime mover mounted on said top for driving said shaft, a propeller carried within said chamber by said shaft adjacent said opening for rotation with said shaft, said propeller driving air into said chamber and through said passageways upon rotation of said shaft, a blade on the lower end of said shaft, and disposed for rotation between said passageway openings, said blade being disposed in a transverse plane normal to the axis of said shaft and adjacent the lower edge of said housing body, and means for controlling the tilting of said housing body.

4. A mowing machine comprising a housing body defining a chamber therewithin, the chamber being open at its bottom portion, baffle mounted within said chamber of said housing body, said housing and said baffle defining a pair of separate opposed passageways for the passage of air downwardly, a shaft protruding through said housing body and said baffle, a prime move mounted on said housing body for driving said shaft, a propeller within said chamber above said baffle and driven by said prime mover, and a blade below said baffle at the lower end of said shaft, said blade being disposed in a plane adjacent the lower edge of said outer housing.

5. A mowing machine comprising a hollow housing having an open bottom and an open top, a baffle secured to the sides of said housing and defining with said housing front and rear downwardly extending separate passageways, a shaft in said housing and protruding through said baffle, a prime mover mounted on said housing for driving said shaft, a propeller carried by said shaft within said housing above said baffle for rotation with said shaft when said shaft is driven by said prime mover, and a blade on said shaft below said baffle and between said passageways.

6. A mowing machine comprising a hollow tubular housing, a baffle within said housing, said baffle including a cup shaped hub, a frusto-conical downwardly diverging baffle plate and an annular apron protruding downwardly from the edge of said baffle plate, said apron being secured on opposite sides to said housing and defining with said housing a forward passageway and a separate rear passageway, a bearing in said cup shaped hub, a shaft protruding through said bearing and said hub, a prime mover mounted on said housing and driving the upper end of said shaft, a propeller carried by said shaft between said prime mover and said baffle for rotation with said shaft when said shaft is driven by said prime mover for directing air downwardly through said passageways, said annular apron being provided with a port communicating with one of said passageways, a blade on the lower end of said shaft below said baffle, said blade being disposed in a transverse plane normal to the axis of said shaft and within the confines of said apron, and a handle assembly fixed to said housing, said handle assembly including a pair of handles for guiding said housing.

7. In a power mower, in combination:
housing means comprising spaced, stationary members providing first and second chambers;
a rotary power source mounted on said housing means;
rotary cutting means disposed in said first chamber and operatively connected with said power source;
rotary impeller means for inducing a flow of pressure fluid;
said rotary impeller means disposed in said second chamber and operatively connected with said power source;
discharge means for communicating pressure fluid from said second chamber against a supporting surface for effecting a lifting reactance against said housing means sufficient to support the weight of said mower.

8. In a power mower, in combination:
housing means comprising spaced upper and lower housing members;
said lower housing member being stationarily fixed to said upper housing member;
a plenum chamber generally defined between said housing members;
a cutter blade chamber generally defined between said lower housing member and a horizontal supporting surface for said mower;
a rotary power source mounted on said housing means;
a rotary cutter blade disposed in said lower housing member;
rotary impeller means disposed in said plenum chamber operable to induce a flow of pressure fluid therefrom; and,
pressure fluid discharge means opening downwardly from said plenum chamber to direct pressure fluid against said supporting surface;
said pressure fluid reacting between said housing means and said supporting surface to provide air cushion means for supporting the weight of said mower.

9. The combination according to claim 7, wherein said pressure fluid discharge means comprises an annular nozzle defined by radially spaced portions of said housing members and opening between concentric marginal edges of said housing members.

References Cited by the Examiner
UNITED STATES PATENTS 3,110,996  11/1963  Dahlman _____ 56—25.4
3,170,276  2/1965   Hall _____ 56—25.4

ANTONIO F. GUIDA, *Acting Primary Examiner.*

ABRAHAM G. STONE, *Examiner.*